United States Patent
Watkins

Patent Number: 5,403,051
Date of Patent: Apr. 4, 1995

[54] PLASTIC STICK FOR FORMING ICE CONFECTIONS

[75] Inventor: Donald Watkins, Alexandria, Va.

[73] Assignee: Perfect Stick Inc., Woodbridge, Va.

[21] Appl. No.: 933,107

[22] Filed: Aug. 21, 1992

[51] Int. Cl.⁶ .............................................. A23G 9/26
[52] U.S. Cl. ........................................ 294/5.5; 294/1.1;
    294/902; 426/134
[58] Field of Search ................... 294/1.1, 5.5, 87.1,
    294/87.11, 99.2, 902, 23.5; 426/91, 100, 101,
    104, 134

[56] References Cited

U.S. PATENT DOCUMENTS

| | | | |
|---|---|---|---|
| 910,914 | 1/1909 | Daly et al. | |
| 1,593,858 | 7/1926 | Venable | 426/134 X |
| 1,847,415 | 3/1932 | Snell | 294/5.5 |
| 1,867,945 | 7/1932 | Hunter | 294/5.5 |
| 1,929,906 | 10/1933 | Skokowski | 426/134 X |
| 1,936,816 | 11/1933 | Zitzman | 426/134 X |
| 1,980,588 | 11/1934 | Hopp | 426/134 |
| 2,044,894 | 6/1936 | Wilson | 264/28 X |
| 2,211,197 | 8/1940 | Cahoon | 294/5.5 |
| 2,464,515 | 3/1949 | Kennedy | 294/5.5 |
| 2,469,589 | 5/1949 | Barricini | 46/134 X |
| 2,583,355 | 1/1952 | Bond | 294/5.5 |
| 2,821,481 | 1/1958 | Moslo | 294/5.5 |
| 2,929,340 | 3/1960 | Töpfer | 425/126.2 X |
| 2,957,435 | 10/1960 | Anderson | 425/126.2 X |
| 3,031,978 | 5/1962 | Rasmusson | 425/125 |
| 3,407,755 | 10/1968 | Rasmusson | 425/126.2 |
| 3,498,808 | 3/1970 | Wagner | 294/5.5 |
| 3,663,717 | 5/1972 | Coster | 426/104 |
| 3,748,778 | 7/1973 | Ellies et al. | 426/134 X |
| 3,968,262 | 7/1976 | Hodska | 426/134 |
| 4,018,902 | 4/1977 | Dee | 294/5.5 |
| 4,105,384 | 8/1978 | Morch | 425/126.2 |
| 4,141,578 | 2/1979 | Zinder | 294/5.5 X |
| 4,507,070 | 3/1985 | Armstrong et al. | 425/126.1 |
| 4,548,573 | 10/1985 | Waldström | 425/126.2 X |
| 4,611,468 | 9/1986 | Degn | 425/126.2 X |
| 4,976,597 | 12/1990 | Schultz | 425/126.2 |
| 4,986,080 | 1/1991 | Grigoli et al. | 426/101 X |
| 5,042,860 | 8/1991 | Bouton | 426/134 X |
| 5,056,841 | 10/1991 | Yong | 294/5.5 X |

FOREIGN PATENT DOCUMENTS

2156958 10/1985 United Kingdom .............. 426/91

*Primary Examiner*—Dean J. Kramer
*Attorney, Agent, or Firm*—Donald Watkins

[57] ABSTRACT

Apparatus and method for molding ice cream and ice confections on plastic sticks which includes the step and equipment for cooling the sticks to critically low temperatures prior to insertion into the cold confection mold to prevent the common problem of shattering, splintering and warping of the plastic stick which results from the drastic temperature change of the plastic stick in a matter of fractions of a second. In addition, methods and apparatus for forming plastic confection sticks having unique shapes, texture and surface configuration are disclosed and sticks having such characteristics are shown.

8 Claims, 5 Drawing Sheets

PLASTIC STICK FOR FORMING ICE CONFECTIONS

BACKGROUND OF THE INVENTION

1. Field of the Invention

The invention relates to forming ice cream and ice confections on plastic sticks and specifically relates to the one problem that has made it virtually impossible to use plastic sticks in forming ice confections. It is currently the industry standard to form such ice confections on sticks made of wood. Producers in the ice confection art have tried for years to employ plastic sticks but have had no success. As the speed of production of ice confections has increased, the time allowed for the stick to be inserted into the confection mold and to permit the temperature of the stick to equalize with the confection mold has decreased. The stresses resulting from the rapid thermal changes within the stick cause the stick to shatter, become unacceptably brittle, splinter, warp and become unusable.

Ice confection producers have been forced to use wooden sticks because sticks made of wood do not develop the thermal stresses when plunged from room temperature to the low temperature of the confection molds. Because wooden sticks are fibrous, the stresses within the wooden stick are relieved because the fibers can slip and adjust relative to one another to relieve the stresses of the thermal shock. As a matter of fact, wooden sticks become even more integral as the temperature is rapidly reduced because the fibers of wood not only slip relative to each other when under thermal stress, but they actually interlock and form a more rigid structure at low temperatures. Any consumer of ice confections which employ wooden sticks will note that the stick will become softer and the fibers will unlock as the confection is eaten and the stick is held in the mouth.

Further problems relating to the use of plastic sticks in the ice confection art relate to the smoothness of plastic surfaces, the lack of porosity of the plastic and the fact that the ice confection tends to slip from the plastic stick either during the confection forming process or during consumption of the confection. This problem is even more pronounced in the formation and consumption of ice cream having plastic sticks because of the low coefficient of friction of the plastic stick, which is oil based, and the ice cream, which is high in fat.

2. Description of the Prior Art

The present invention can be used with any conventional ice confection, ice cream or any other confection forming machine or method and simply includes the step in the process or apparatus in the machine for reducing the temperature of the plastic stick to a critically low temperature prior to and/or during the insertion into the confection mold. Conventionally, ice confection machines include rows of molds or confection cavities which are advanced through a brine tank or other refrigerating means, filling means for filling the molds with a confection substance which immediately begins to freeze and solidify, a stick insertion means for inserting individual (or plural) sticks into the confection which fills the molds at a point in time when the confection has solidified to the stage where it is solid enough to support the stick without appreciable relative movement. As the freezing process continues, the confection becomes firmly frozen and attached to the stick and continues to advance to an extraction means. Most often in today's high speed ice confection machines the confection is extracted from the mold by raising the temperature of the mold surrounding the frozen confection, gripping the stick and removing the frozen confection and stick by lateral movement between the stick gripping means and the mold. After the confection is frozen to the stick, it is removed from the mold and is passed to a wrapping and/or other storage means. When the confection does not have a uniform shape and thus cannot be withdrawn laterally it is obvious that an articulated mold may be used and the mold can be opened prior to lateral movement between the confection and the mold. Machines for making frozen confections may be in-line or circular wherein the confection molds move through the brine tank or other refrigeration means in a straight line, a curved line or circular path. Common machines for forming ice confections and inserting sticks into the confection during formation are included under the trademarks "VITALINE", "GRAM", "HOYER" and "STORMAX".

The prior art also shows the extreme difficulty of forming a solid bond between plastic sticks and confections of all kinds. Attempts have been made to increase the bond between sticks and the confection and include forming holes, shaping, and forming cavities or grooves in the stick.

The only significant reference found during a preexamination search dealing with temperature control of sticks prior to or during formation of ice confections appears to be U.S. Pat. No. 2,957,435 [S. F. Anderson]. Anderson discloses chilling sticks to a temperature below the temperature of a semi-solid confection to ensure that the confection will sufficiently freeze to the stick to prevent the semi-solid bar from becoming dislodged from the stick during 16 subsequent handling of the bar by its stick handle. Col. 7, lines 5-11 of this reference refers to FIG. 6 and stick handle 30 which appears to be a common round stick made of twisted paper. There is no mention in this reference of plastic sticks or the problems of splintering, shattering, warping etc. associated with using plastic sticks or the problems of bonding the confection with plastic sticks. The present invention is directed to maintaining plastic confection sticks at critically low temperature prior to insertion into ice confections to prevent stick deterioration due to thermal shock and not to create bonding between sticks and semi-solid confections. In claim 1 of Anderson (435) it is seen that the sole purpose of cooling the stick (non-plastic) is to cause bonding of the semi-solid confection to the cold stick so that the confection may be transported through a freezing chamber while supported by the stick handle. As a matter of fact, the stick handle is not released by the stick inserter after insertion into the confection. Anderson discloses that the temperature of the stick is below the temperature of the confection. In the instant invention the temperature of the stick is controlled to different levels depending on the specific material of the stick and .the thermal gradient between the stick and the ice confection mold in modern high speed confection machines. Just cooling the sticks to a temperature below that of the confections to promote freezing of the confection to the cold stick is not sufficient to prevent deterioration of the stick. It is imperative to control the temperature to which the stick is cooled prior to insertion taking into consideration the specific material of the stick and the ultimate low temperature to which the plastic stick is subjected after insertion into the confection material.

U.S. Pat. No. 1,593,858 shows a popsicle or confection stick made of farinaceous material having circumferential or spiral grooves or any serrated or roughened surface. U.S. Pat. No. 2,929,340 shows inserting a knife into an ice cream body which melts a hole into the ice cream, withdrawing the knife and then inserting a stick into the hole and the melted ice cream then freezes about the stick. U.S. Pat. 2,469,589, 3,498,808, 3,663,717 and 3,748,778 show plastic materials used for forming confection sticks. U.S. Patents 1,929,906, 2,211,197, 2,821,481 and 5,042,860 show surface irregularities on sticks for retaining confections on sticks. U.S. Pat. Nos. 3,031,978, 3,407,755, 4,105,384, 4,507,070, 4,801,063, 4,976,597, 4,986,080 and United Kingdom Application 2,156,958 show methods and apparatus for inserting sticks in ice confections and withdrawing the stick supported ice confections after freezing. U.S. Pat. No. 2,052,574, 4,548,573 and 4,611,468 show inserting pegs and then removing the pegs prior to stick insertion in ice confection machines. U.S. Pat. No. 2,044,894 shows, in a batch process, sticking sticks into semi-solid confection material, freezing the material, heating the molds to release the outer surface of the ice confection and withdrawing the stick filled ice confection.

SUMMARY OF THE INVENTION

The invention herein disclosed is a method and apparatus for forming ice confections having plastic sticks inserted in the confection and also plastic sticks having shapes and textures suitable for supporting ice confection products without the stick becoming dislodged from the confection either during the confection manufacture or during consumption of the products. Stick supported ice confection products produced today almost universally use wooden sticks. Wooden sticks are usually made of birch, maple or poplar. There are major problems associated with wooden sticks such as uniformity, moisture content and even the availability of trees from which the sticks are produced. Not only are the characteristics of trees variable but the machines for making such wooden sticks produce sticks of variable quality. The storage facilities and shipping procedures of the various companies that produce wooden sticks also cause varying levels of moisture content, fungal growth and other impurities. The problem of wooden stick uniformity, purity and availability have in recent years caused manufacturers and supplies to look outside the United States for new supplies of sticks. Currently sticks are imported into this country from Chile, China and even Russia among other countries. These supplies are sometimes unreliable and cannot begin to meet the increasing demand for sticks in the ice confection industry.

For many years, confection producers have tried to manufacture ice confections using plastic sticks, but have achieved only very limited results. While it is possible to produce uniform sticks using modern plastic extrusion and molding machines, the plastic sticks have not been widely accepted because the sticks have failed in the ice confection process. When the plastic stick is inserted into the confection mold and the temperature is reduced rapidly from room temperature to the mold temperature, which may be as low as minus 50° Fahrenheit, the plastic polymer links become differently stressed and cause bending and fracture within the stick. It is important that the stick not warp either before or after insertion into the ice confection mold because the stick gripper fingers of the confection machine must be able to locate the stick precisely before and after the stick is inserted in the confection. It can be seen that if a stick is warped or curved prior to insertion, then the end of the stick inserted into the confection will not be centered relative to the confection which results in non-uniform confections and probable failure of the stick to remain integral with the product. On the other hand, if the stick is inserted correctly within the confection mold and then, due to thermal gradients from end-to-end and from center to outside skin of the stick, warps or becomes non-uniformly oriented within the confection, the gripper fingers of the extraction device will not be able to grip the stick and easily withdraw the confection without displacing the stick relative to the confection. This relative movement can and does cause breakdown of the bond between the stick and the confection with the result that when it is attempted to remove the confection from the mold by gripping and moving the stick laterally relative to the mold, the confection stays in the mold and the stick alone is retracted. This alone causes stoppage of the confection machine to permit the removal of the "stickless" confection from the mold, with the attendant loss of production and high cost.

When the thermal shock resulting from plunging the plastic stick into the low temperature confection mold filled with semisolid confection breaks the polymer bonds within the stick, fractures and cracks develop within the stick and particles of the plastic stick become lodged in the confection, which is totally unacceptable in consumable products. It is not the reduction of the temperature of the plastic stick from room temperature (75° F.) to the temperature of the mold (as low as −50° F.) that causes warping and fracture of the stick but is a function of the temperature reduction to such low levels in such a short period of time. Plastic sticks made of for instance polyethylene, polystyrene, polypropylene, acrylonitrile or other suitable material will not develop fractures, splinter or warp simply as a result of being maintained at the low temperatures employed in ice confection forming machines. It is not imperative that the sticks be cooled all the way to the lowest temperature which will be reached. It is only required that the temperature of the plastic stick be reduced to a temperature such that the remaining temperature differential be small enough that the thermal shock will be reduced to a level which does not cause the plastic stick to deteriorate.

Inserting a plastic popsicle stick at room temperature into a much colder popsicle substance often results in the cracking, warping and/or shattering of the stick. These defects are due to a phenomena called thermal shock. This process is a result of a destructive combination of two principal thermal properties.

Thermal expansion is the tendency for a material to expand when subjected to higher temperatures (or contract when exposed to lower temperatures). When the temperature of a substance is increased, by definition the vibration of the individual atoms in the substance becomes increasingly vigorous, due to the increased energy. This leads to an increase of the average distance between adjacent atoms. As the intermolecular distance increases, the apparent size of the sample will also increase. This expansion has been effectively modeled using a linear coefficient of thermal expansion, $\alpha$, a constant for a particular material. The expansion is given as:

$$\alpha = \frac{dL}{LdT}$$

where dL represents the change in any dimension from its original length L when exposed to a temperature change of dT. Thermal conductivity is the mechanism of heat transfer through a substance. The coefficient of thermal conductivity, k, can be derived from Fourier's Law (for steady state conduction through a flat slab):

$$k = -\frac{\frac{\Delta Q}{\Delta t}}{A\left(\frac{\Delta T}{\Delta x}\right)}$$

where $\Delta Q/\Delta t$ is the rate of heat transfer across an area A as a result of a temperature gradient $\Delta T/\Delta x$. The important thing to note about k is that it describes how rapidly heat is diffused through the material. A higher k value represents better heat transfer abilities (conductors), a low k value indicates that a material would make a good insulator. If k were 0 for a material, it would be called a "perfect insulator": energy could simply not be transferred through the material. Likewise, a "perfect conductor" would have an infinite k value. There are no "perfect" materials every known substance has a finite, non-zero value for k.

Using the popsicle stick as an example, it is easy to show how these forces interact to cause thermal shock failure. The first illustration shown below is a representation of the temperature profile across the popsicle stick at equilibrium at room temperature - it is uniform at T(old). The second illustration shows the internal stresses in the stick. It can be assumed that the stick was manufactured to be stress-free at room temperature, so the stress profile is linear.

Immediately after plunging the stick into the popsicle mold the temperature distribution looks something like that shown in the third illustration shown below. As the specimen cools, the outsides (directly exposed to the cold environment) chill first, leading to an uneven temperature distribution. The temperature will eventually equalize, leading to a flat distribution at T(new), but since there is no such thing as a "perfect conductor" (k=∞) this equalizing process will take some time. So, for the moment just after introducing the stick into the mold, there will exist an uneven temperature distribution. Due to the previously mentioned thermal expansion effect, the outsides will contract because of the new lower temperature, while the material inside remains near its original size and temperature T(old). The surface (in its effort to contract) "pulls" the interior into compression, and is itself "pulled" into tension. This leads to a stress distribution as shown in the fourth illustration. Since most materials inevitably have small surface imperfections, the tensile stress at the surface creates a potential for fracture. Imagine stretching a rubber band after cutting a small nick in one side: the cut provides the starting point for the propagation of a destructive crack.

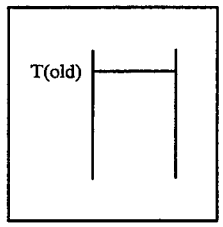

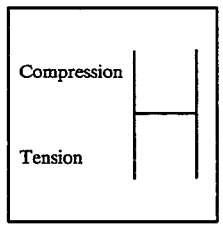

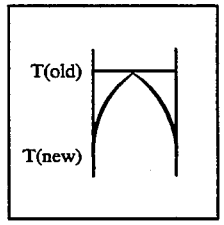

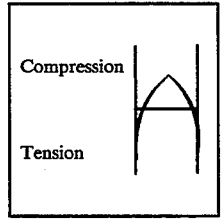

The stresses in the plastic sticks which result from the thermal shock referred to supra are evident in the stick measured from end-to-end, side-to-side and also from the center of the stick to the outer surface or skin of the stick.

In addition to the problems created by thermal shock to plastic confection sticks, there is another serious problem in using plastic for confections. The surface area of known plastic sticks is much less porous than the surface area of wooden sticks and because of this lower porosity, the ice confection will not adhere to the plastic as easily as it will to wooden sticks. In continuous high speed ice confection producing machines, the confections are withdrawn from the molds by gripping the stick which extends from the confection. Some confections, especially high fat ice creams, do not permeate the low porosity plastic sticks and therefore the bond between the stick and the confection may be too weak to support the confection on the stick when it is withdrawn laterally from the mold. The problems of leaving a confection in a mold when it should be withdrawn are so large, that they are completely unacceptable to the confection industry. It is another object of the present invention to form plastic ice confection sticks from polyethylene, polystyrene, polypropylene, acrylonitrile or any other suitable plastic material which is non-toxic and non-soluble in water. The surface area of plastic stick is modified to make the surface more porous or to create protrusions or indentations. The surface can be made more porous by mechanical means in the extrusion or molding process or by adding modifiers to the plastic to increase the porosity. It is also possible to increase the porosity by specularizing the surface of the plastic stick. The surface of the stick may be formed having a large number of small fibers or fibrils extending therefrom. The plastic stick having the surface modified as mentioned may have grooves or cutout portions or have symbols or shapes impressed thereon. The sticks may also have color modifiers added. It is also possible to form the plastic stick to have various surface textures, including a surface texture very much like a wooden stick. This texture can be formed mechanically after the stick is extruded or molded or by a process, which is known, of heat and pressure bonding small slivers and strips of the plastic material. Another method of forming plastic sticks is by forming a plastic laminate wherein the various materials in the laminate are chosen such that the stresses created by the thermal shock are offset.

Preferred Embodiments

Figure 1:
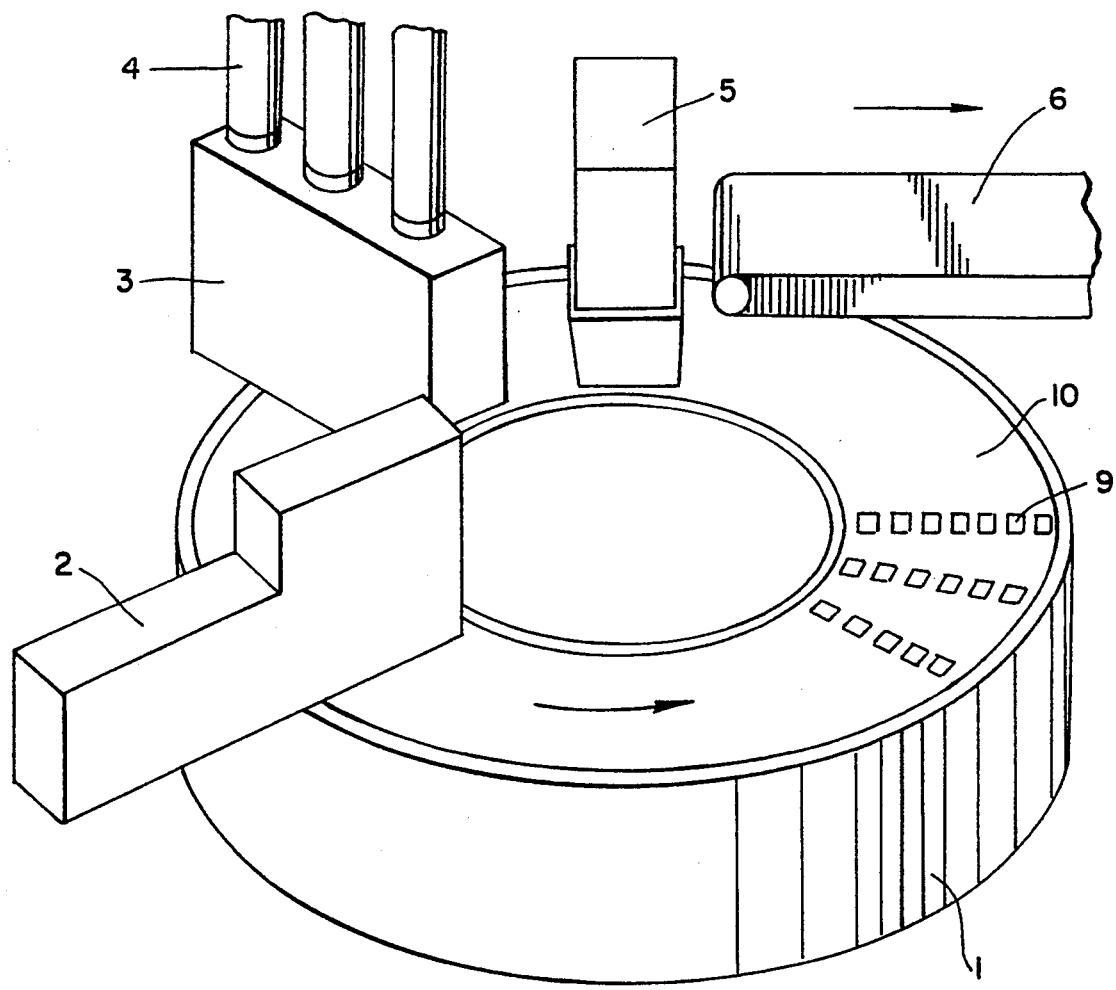
FIG. 1 is a diagrammatic representation of a frozen confection forming machine incorporating a stick magazine.

It is known that the temperature of the center of the ice confection at the time the stick is inserted into the confection is approximately 30°-32° F. After the stick is inserted, the temperature of the ice confection in the molds is further reduced to as low as −50° F. The total time for the stick to go from 75° F. (room temperature) to its ultimate low temperature (as low as −50° F.) is approximately 150 seconds. It is therefore seen that the temperature of the stick is reduced at the rate of about 0.84° F. per second. No known plastic in the shape of a confection stick (long, narrow and thin) can withstand such thermal shock without undergoing polymer stress which produces the defects mentioned previously.

The particular plastic material used to form the confection stick determines the temperature to which the stick must be cooled prior to insertion into the semi-solid confection material. For instance, it is only necessary to reduce the temperature of polyethylene sticks to approximately 30° F. prior to insertion into the confection material which reduces the thermal shock to a rate of about 0.54° F. per second. At this lower thermal shock rate the polymer bonds of polyethylene will not break down, and the stick will not crack, splinter, become fragmented or warp. Another factor in establishing the temperature to which the stick must be lowered prior to insertion is the surface texture of the stick. When the surface texture of plastic sticks is modified by mechanical means, by irregular shaping of the extrusion mold, or by chemical modifiers in the plastic material, there are created inherent residual stress points on the surface of the stick. These residual stress points act as propagation zones for polymer stresses when the sticks are subjected to thermal shock. In the case of polyethylene having a specularized surface texture it may be necessary to reduce the temperature of the stick prior to insertion in the confection material to a temperature of 25° F. Anyone with skill in the art can easily determine what level of pre-cooling is required for a given combination of stick shape and plastic material type. As a matter of fact, it is envisioned that any plastic stick produced in accordance with this invention will be coded to indicate what level of pre-cooling is required.

In the method of forming ice confections using plastic sticks, it is preferred that the sticks be cooled to the desired critical temperature by placing said sticks, boxes of said sticks or magazines containing said sticks into refrigerated storage means which is separate from the ice confection producing machine. The sticks are left in the refrigerated storage means for such time as it takes for the sticks to equalize with the temperature of the storage means. It should be noted that there is no deleterious effect on the plastic sticks if the temperature to which they are lowered is below the critical temperature required for use in this process.

In a second embodiment of this invention, it is preferred that the sticks, boxes of sticks or magazines containing said sticks be placed in a stick cooling compartment which is mounted on the ice confection forming machine proximate means for grasping said sticks and inserting them into the confection material in the molds of said machine. Means are provided associated with said stick cooling compartment to ensure that said sticks are equalized at the critical temperature required. In the simplest form of the cooling compartment there may be provided a first compartment of suitable size to accommodate a variety of shapes of boxes containing sticks (10,000 or more) and having a coil or second compartment surrounding said first compartment and brine or other refrigerant material can be passed through metering means to pass through the coil or through the space between the first and second compartment. The metering means may include a valve for metering the brine or may be an expansion valve for expanding a supercooled refrigerant such as freon. The preferred embodiment for forming ice confections of the present invention includes the sequential steps of cooling plastic sticks to a critically low temperature to ensure they will not crack, splinter, warp or become unusable when subjected to the low temperatures of the ice confection process, filling the molds of the ice confection machine with confection material and cooling the molds to the point where the confection material is semi-solid, gripping the pre-cooled sticks and inserting them into the confection material in said molds, continuing to cool the molds to the point where the confection material becomes completely frozen and bonded to the plastic stick, gripping the sticks which are bonded with the confection material, raising the temperature of the mold surrounding the confection material, withdrawing the confection material from the mold by moving the stick bonded to the confection material laterally relative to the mold and thereafter wrapping the completed stick supported confection.

A preferred embodiment of the apparatus of the present invention includes a refrigerated compartment mounted on the ice confection machine proximate stick gripping and inserting means for inserting sticks into confection material in the molds of the ice confection machine.

A second preferred embodiment of the apparatus of the present invention is an insulated compartment proximate stick gripping and inserting means. The insulated compartment is functional to maintain the temperature to which sticks are lowered in a separate cooling means.

Figure 3:
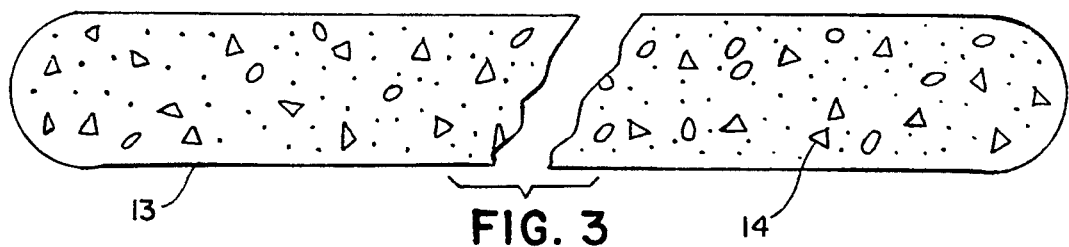
FIG. 3-10 show top, side and end views of various forms of the plastic stick disclosed.
Figure 4:
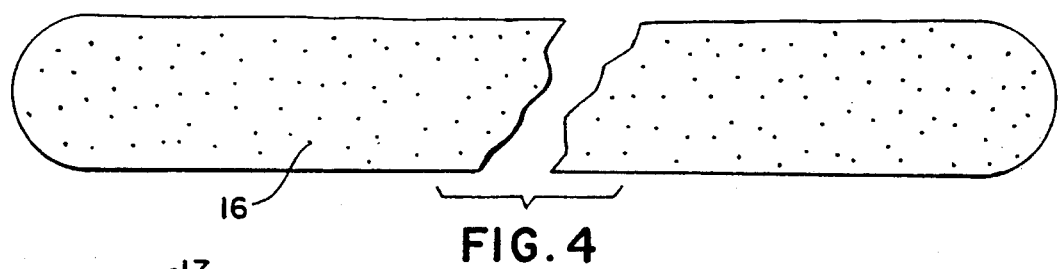
Figure 5:
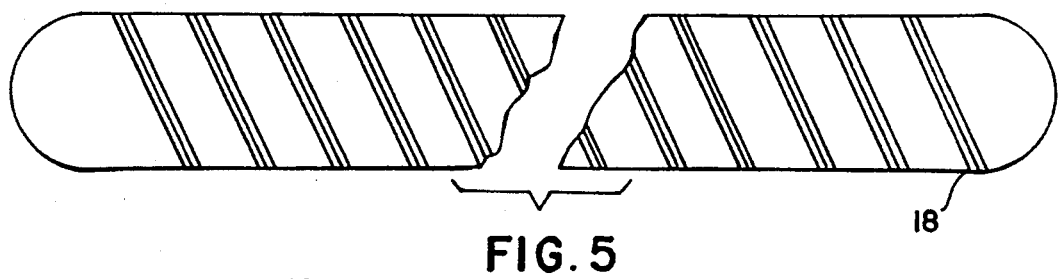
Figure 6:
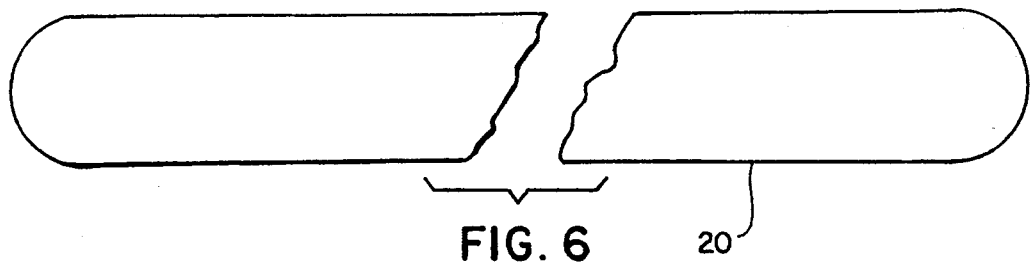
Figure 7:
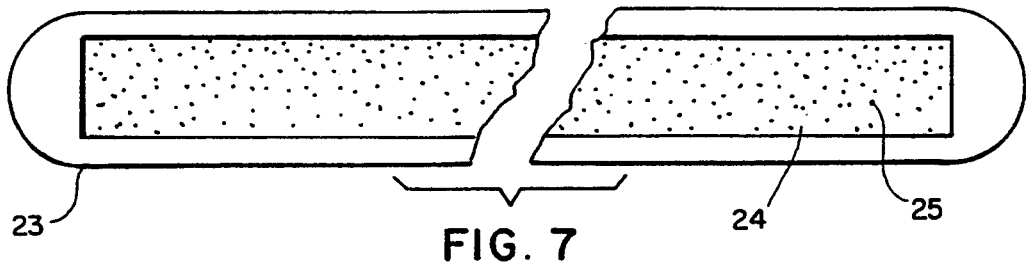
Figure 8:
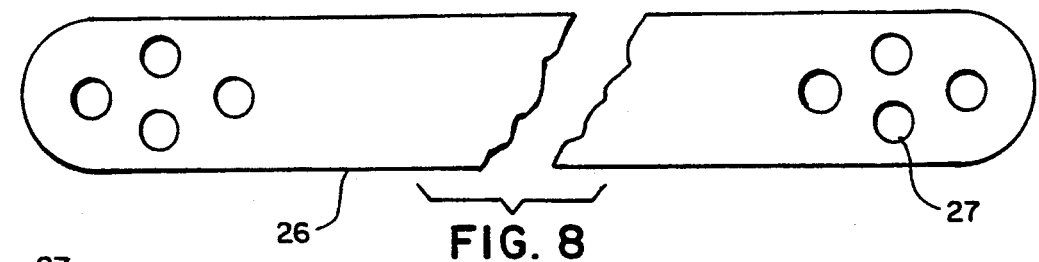
Figure 9:
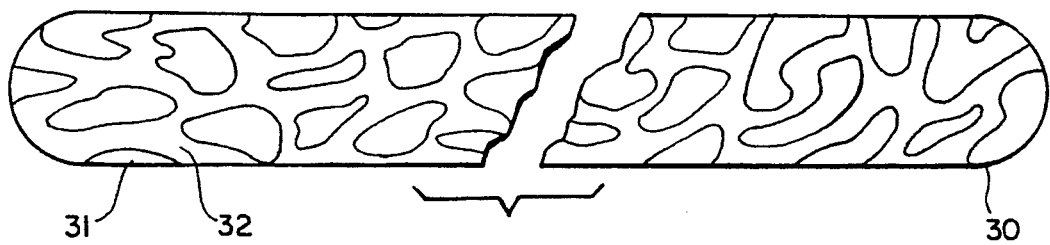
Figure 10:
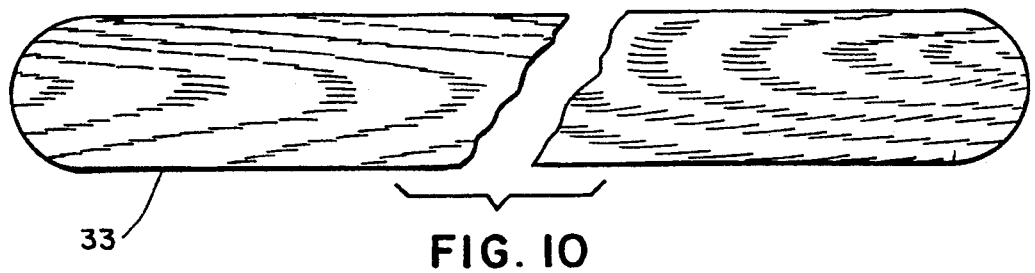

Preferred embodiments of the plastic sticks are best described with reference to the drawings. FIG. 3 shows a plastic stick having a plurality of small indentations and/or depressions. Such indentations or depressions may number up to 1000 per square inch. FIG. 4 shows a plastic stick having short fibers or fibrils extending outwardly from the surface of the stick to produce a roughened or hairy surface. FIG. 5 shows a plastic stick having diagonal striations. FIG. 6 shows a plastic stick made of a coated thermoplastic material. FIG. 7 shows a shaped plastic stick wherein the center portion is recessed and is roughened. FIG. 8 shows a plastic stick having holes extending through the stick. FIG. 9 shows a plastic stick having a surface configuration best described as containing "islands" and "seas". This surface configuration is produced by a chemical blend of materials, and at least one of the materials is leached out or removed in the extrusion bonding process. FIG. 10 shows a plastic confection stick having a woodfiber like surface area.

Detailed Description of the Drawings

Reference to FIG. 1 shows a generalized layout of a frozen confection forming machine including a brine tank 1 wherein molds 9 are circulated to freeze the confection material inserted into the molds 9 by metering means 3 supplied by confection which has two planar surfaces and supply ducts 4. The molds 9 are shown to be held by and moved through the brine tank in a counter-clockwise direction by driven holding means 10. There are 3 rows of molds 9 shown on holding means 10 but this is merely a schematic representation and in fact the entire extent of holding means 10 is filled with rows of molds. As the molds 9 held by holding means 10 are moved through the brine tank 1 from the confection metering means 3, the confection begins to freeze. After the molds 9 move only a relatively short distance from the confection metering means 3, the confection begins to freeze and at the point where the confection becomes semi-solid, there is located a stick inserting means 2 which takes the sticks from a supply means, orients the individual sticks and inserts them into the semi-solid confection. According to the present invention it is understood that the sticks supplied to the stick inserting means 2 are either pre-cooled prior to being supplied to the inserting means 2 or said inserting means 2 may include cooling means to reduce the temperature of the sticks to a critically low temperature prior to inserting said sticks into the semi-solid confection material. After the sticks are inserted by inserting means 2 into the semisolid confection material in the molds 9 the temperature of the molds 9 is further and quickly reduced to as low as −50° F. for freezing the confection material into a solid body. After complete freezing of the confection material the molds 9 are moved by holding means 10 to confection withdrawal means 5. The confection withdrawal means 5 includes means for gripping the sticks which have become integral with the frozen confection material and for withdrawing the integral sticks and confection from the molds 9. In the area of the brine tank 1 adjacent the withdrawal means 5, the molds are subjected to a higher temperature so that the outer portion or "skin" of the frozen confection is loosened and thereby allowed to move freely relative to the molds 9. 6 shows means for receiving the composite stick and confection from withdrawing means 5 and for transporting the completed confection to a wrapping station (not shown).

Figure 2:
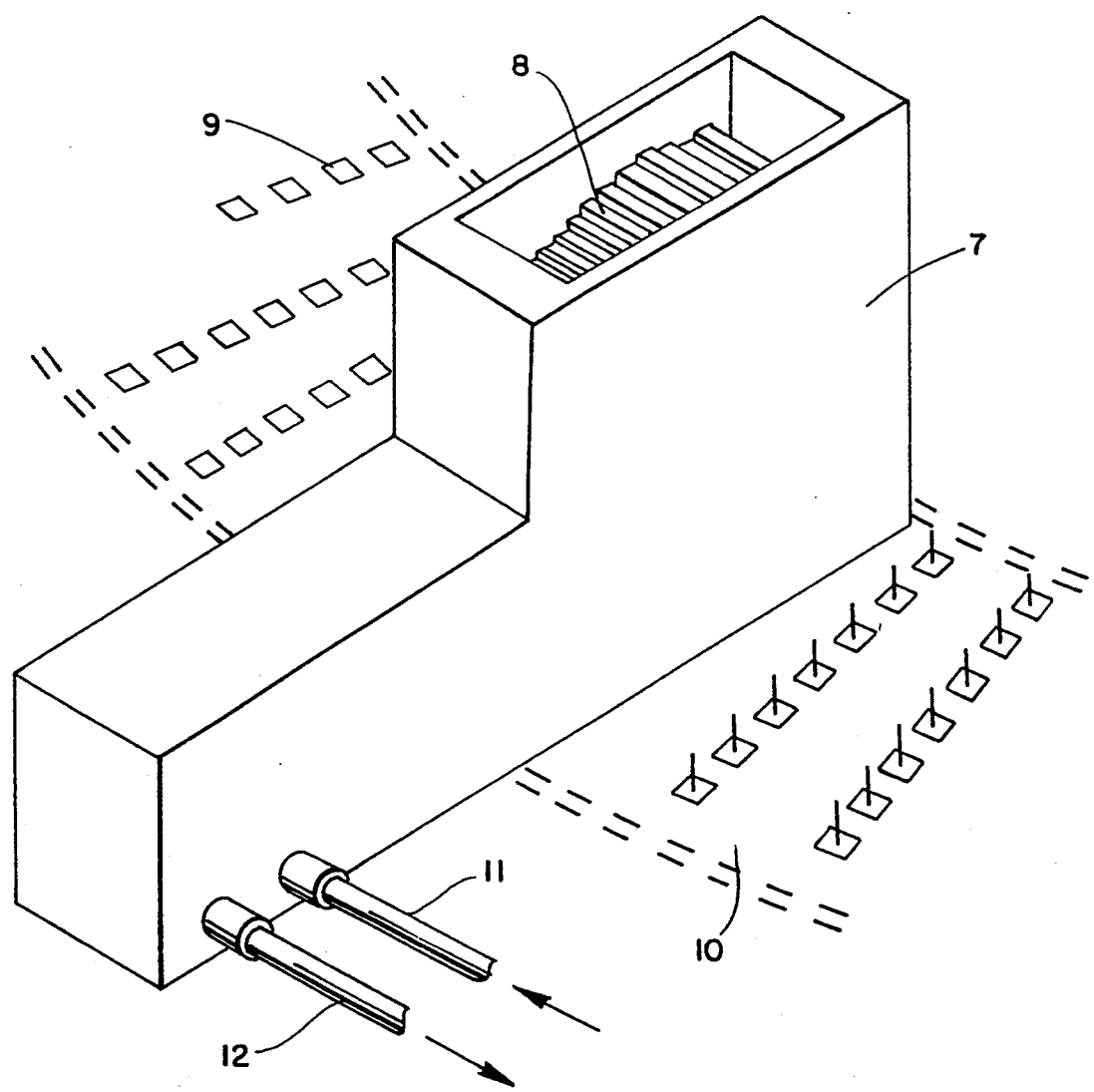
FIG. 2 is an enlarged view of the stick magazine with a cooling means.
Figure 3A:
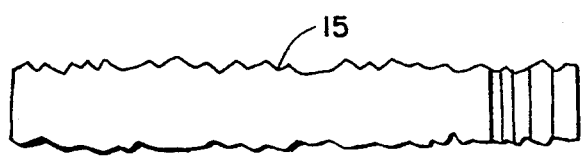
Figure 3B:

FIG. 2 shows a stick inserting means 7 containing sticks 8. The inserting means 7 is refrigerated or cooled to lower the temperature of the sticks prior to orienting the sticks and inserting them into the confection material in the molds 9. The inserting means is cooled by circulating either brine or other refrigerant into tube 11 and removing same through tube The stick 13 shown in FIG. 3 shows a roughened or pitted surface 14 which in effect produces an artificial porosity. FIG. 3A shows the pitted and roughened surface 15 of the plastic stick in side view. The surface texture of stick 13 is achieved by either mechanically abrading the stick after molding or by providing an extrusion mold having a surface which produces the texture described. FIG. 3B is a sectional view made by cutting the stick on a plane perpendicular to the stick's central lengthwise axis.

Figure 4A:
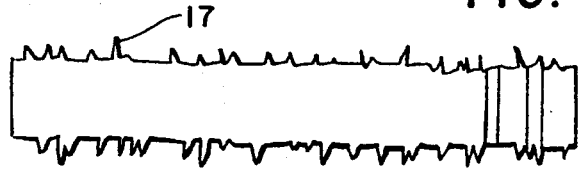
Figure 4B:
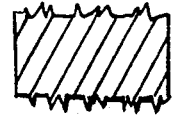

FIGS. 4, 4A and 4B show top, side section and end section of a plastic stick 16 having protuberances or fibrils 17 extending outwardly from the surface of stick 16. This surface texture provides a stick which is rough or scratchy to the touch and allows the confection to freeze and interlock with the protuberances to ensure a firm interconnection.

Figure 5A:
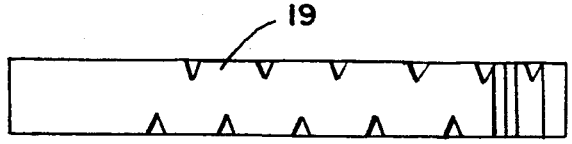
Figure 5B:
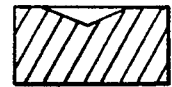

FIGS. 5, 5A and 5B show top, side section and end section of a plastic stick having diagonal striations 18 that permit the confection to enter the striations or grooves 18 to form a firm anchoring means for the confection which is frozen to become integral with the stick. FIG. 5A shows a side view of a plastic stick having striations or grooves 19 which extend to the edges of the stick.

Figure 6A:
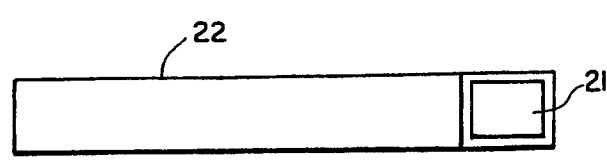
Figure 6B:
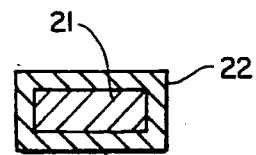

FIGS. 6, 6A and 6B show top, side section and end section of a plastic stick 20 composed of a first thermoplastic 21 having a surrounding differing thermoplastic material 22. Such a laminated or coated plastic stick resists the deleterious stick deterioration mentioned earlier, since the thermal stress produced by rapidly lowering the temperature of the stick can be controlled. This control can be effected by choosing the inner material 21 for strength and thermal stress resistance and choosing the outer thermoplastic material 22 for porosity and adhesion of the confection material thereto.

Figure 7A:
Figure 7B:
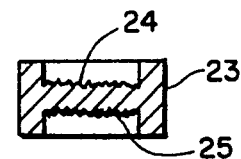

The plastic stick of FIGS. 7, 7A and 7B show the center 24 of the stick being recessed and the surface of the recessed portion either pitted or roughened or even having protuberances or fibrils 25 extending from the surface thereof.

Figure 8A:
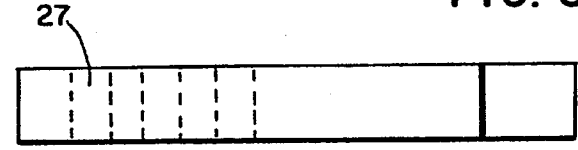
Figure 8B:
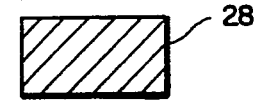

FIGS. 8, 8A and 8B show top, side section and end section of a plastic stick 26 having holes 27 either punched or molded therein. Such construction permits the confection in its semi-solid condition to flow through the hole and form an anchor from one side of the stick to the other by freezing the confection as a solid piece through the holes to each side of the stick.

Figure 9A:
Figure 9B:
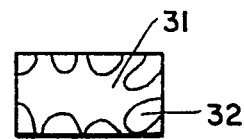

FIGS. 9, 9A and 9B show top, side section and end section of a plastic ice confection stick 30 which is formed by molding a plastic stick from a blend of polymers and wherein one of the polymers is removed, as in a "leeching" process, to leave a stick comprised of surface irregularities including nubby islands and sections 31 and areas 32 which are the portions which have been removed.

Figure 10A:
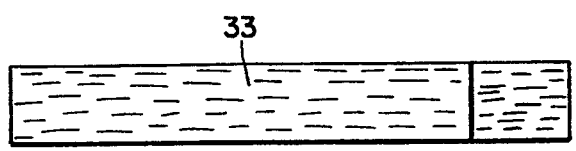
Figure 10B:
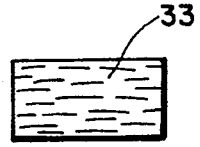

FIGS. 10, 10A and 10B show top, side section and end section of a plastic ice confection stick 33 which has been either molded or extruded to provide a surface texture which resembles the surface texture of a wooden stick.

Any combination of the features shown in FIGS. 3–10 may be incorporated to provide a stick that has a surface having greater holding strength with the confection material. While the cooling of the stick prior to insertion into the semi-solid confection material serves to prevent cracking, splintering or warping of the stick during the freezing process, it can be seen that the surface texture and porosity of the sticks is effective to ensure that the confection holds tightly to the stick after freezing and prior to withdrawing the integral stick and confection product.

Although the invention has been described with reference to particular embodiments thereof, it is understood that the invention is only limited by the claims set forth.

What is claimed is:

1. An injection molded plastic stick for use in ice confections which has two planar surfaces and having a surface texture impressed theron which is rough and includes at least 100 pits and cavities per square inch.

2. An injection molded plastic stick for use in ice confections according to claim 1, wherein the surface texture includes small protrusions or fibrils extending outwardly from the planar surfaces of said stick.

3. An injection molded plastic stick for use in ice confections according to claim 1 wherein the surface texture is a matte finish.

4. An injection molded plastic stick for use in ice confections according to claim 1 wherein the plastic includes modifiers.

5. An injection molded plastic stick according to claim 1 which further includes a protrusion or rib structure impressed on the surface.

6. An injection molded plastic stick for use in ice confections which is flat and has two planar surfaces which are at least 100 pits and cavities per square inch and wherein the plastic is selected from polyethylene and polypropylene.

7. An injection molded plastic stick for use in ice confections according to claim 6 wherein the plastic has coloring agents mixed therein.

8. An injection molded plastic stick according to claim 6 which further includes a protrusion or rib structure impressed on the surface.

* * * * *